(12) United States Patent
Lin

(10) Patent No.: US 6,876,493 B1
(45) Date of Patent: Apr. 5, 2005

(54) ELECTRIC PROJECTION SCREEN ROLLER AND BALANCE ROD ASSEMBLY

(76) Inventor: Hsin-Fu Lin, No. 10, Hsin I Nan Road, Tainan (TW)

( * ) Notice: Subject to any disclaimer, the term of this patent is extended or adjusted under 35 U.S.C. 154(b) by 0 days.

(21) Appl. No.: 10/775,092

(22) Filed: Feb. 11, 2004

(51) Int. Cl.7 .............................. E06B 9/08; G03B 21/56
(52) U.S. Cl. ............... 359/461; 160/903; 160/DIG. 10; 160/23.1
(58) Field of Search ................................. 359/443, 461; 160/23.1, 31, 903, DIG. 10

(56) References Cited

U.S. PATENT DOCUMENTS

| 4,597,430 | A | * | 7/1986 | Marquez | 160/269 |
| 5,296,964 | A | * | 3/1994 | Shopp | 359/443 |
| 5,647,421 | A | * | 7/1997 | Hoffmann et al. | 160/120 |
| 6,111,694 | A | * | 8/2000 | Shopp | 359/461 |

* cited by examiner

*Primary Examiner*—William C. Dowling
(74) *Attorney, Agent, or Firm*—Rosenberg, Klein & Lee

(57) ABSTRACT

An electric projection screen roller and balance rod assembly. The electric projection screen roller and balance rod assembly includes a projection screen roler assembly and a balance rod assembly. The projection screen roler assembly is composed by a main body and an inserting piece, and the projection screen balance rod assembly is composed by a left half portion and a right half portion. A curved against member of the inserting piece is provided to be caught in the inlaying socket of the main body, so as for the upper end section of a projection screen to be firmly secured between, and the lower end section of the projection screen is firmly secured between the left and right half portions of the projection screen balance rod.

2 Claims, 7 Drawing Sheets

ELECTRIC PROJECTION SCREEN ROLLER AND BALANCE ROD ASSEMBLY

BACKGROUND OF THE INVENTION

1. Field of the Invention

The present invention relates to an electric projection screen roller and balance rod assembly. More particularly, the present invention is directed to an electric projection screen roller and balance rod assembly that is provided in a protective housing and included a screen roller assembly and a screen balance rod assembly, so as for the upper end section of a projection screen to be firmly secured to the roller assembly and the lower end section of the projection screen to be firmly secured to the balance rod assembly.

2. Description of the Related Art

Various activities to pass on knowledge and information are frequently held in modern times. Projectors are widely used as auxiliary teaching tools in most teaching activities. Accordingly, a projection screen is indispensable for showing the projected content from the a projector.

While being used, referring to FIGS. 1,2 and 3, an electric projection screen housing 10 containing a scroll of projection screen 20 must be secured to a wall first, and the projection screen 20 together with a balance rod 50 unwinds from a roller 30 to descend below the housing 10 to a lowered, viewing arrangement or winds around the roller 30 to a raised, storage position depending on the rotation of the roller 30 performed by an electrically powered motor.

A conventional projection screen roller 30 does not be provided with any structure for securing one end section of the projection screen 20, but a piece of tape 40 is adhered on a predetermined surface position of the roller 30 for the upper end section of the projection screen 20 to be secured thereto.

Referring to FIGS. 4, 5 and 6, the lower end section 201 of the projection screen 20 is clamped by a balance rod 50, which serves as a suspended weight so as to cause the projection screen 20 to descend or raise in a relatively planar configuration as it unwinds from or winds around the roller 30, and the projection screen 20 can be kept stable while being applied.

While the balance rod 50 being assembled, two pieces of thick paperboard A are provided to clamp the lower end section 201 of the projection screen 20 and then stapled to firmly assemble therewith, the lower end section 201 of the projection screen 20 together with the pieces of paperboard A is inserted in the balance rod 50, and two endcaps 60 are respectively provided to cover both ends of the balance rod 50.

Although the above-mentioned conventional projection screen roller and balance rod can respectively secure the upper and lower end sections of the projection screen 20, there are the following drawbacks in the conventional projection screen roller and balance rod after being used for a period of time:

1. The tape 40 adhered on the surface of the roller 30 will lose stickiness after contacting with the projection screen 20 for a period of time, so that the upper end section of the projection screen 20 will easily separate from the roller 30.
2. Because of the changes of temperatures, the tape 40 adhered on the surface of the roller 30 will lose stickiness after being used for a period of time, so that the upper end section of the projection screen 20 will easily separate from the roller 30.
3. It is troublesome and wastes time for the lower end section 201 of the projection screen 20 to be clamped by pieces of paperboard A and fixed by staples before being assembled with the balance rod 50, and it is easily to cause wrinkles on the projection screen 20 fixed by means of staples.
4. The projection screen 20 must be cleaned by water after being used for a period of time, and the pieces of paperboard A are easily wetted and worn. It is troublesome to replace new paperboard.
5. It is troublesome and wastes time for the lower end section 201 of the projection screen 20 to be clamped by pieces of paperboard A before being inserted in the balance rod 50, and it is also troublesome that the thickness of the pieces of paperboard A must accord with the groove size of the balance rod 50.

SUMMARY OF THE INVENTION

Therefore, the present invention is designed to provide an electric projection screen roller and balance rod assembly that substantially obviates the drawbacks of the related conventional art.

An object of the present invention is to provide an electric projection screen roller and balance rod assembly which can be easily assembled or disassembled.

Another object of the present invention is to provide an electric projection screen roller and balance rod assembly whose projection screen roller assembly can firmly secure the upper end section of a projection screen to prevent from separation after being used for a long time, so as to prolong the service life of the projection screen and the roller assembly.

Still another object of the present invention is to provide an electric projection screen roller and balance rod assembly whose projection screen balance rod assembly can firmly secure the lower end section of a projection screen to prevent from separation after being used for a long time, so as to prolong the service life of the projection screen and the balance rod assembly.

To achieve these advantages, the present invention provides an electric projection screen roller and balance rod assembly. The electric projection screen roller and balance rod assembly includes a projection screen roler assembly and a balance rod assembly. The projection screen roler assembly is composed by a main body and an inserting piece, and the projection screen balance rod assembly is composed by a left half portion and a right half portion. A curved against member of the inserting piece is provided to be caught in the inlaying socket of the main body, so as for the upper end section of a projection screen to be firmly secured between, and the lower end section of the projection screen is firmly secured between the left and right half portions of the projection screen balance rod.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

An preferred embodiment of the electric projection screen roller and balance rod assembly in the present invention includes a projection screen roller assembly and a projection screen balance rod assembly.

Figures 1, 2:
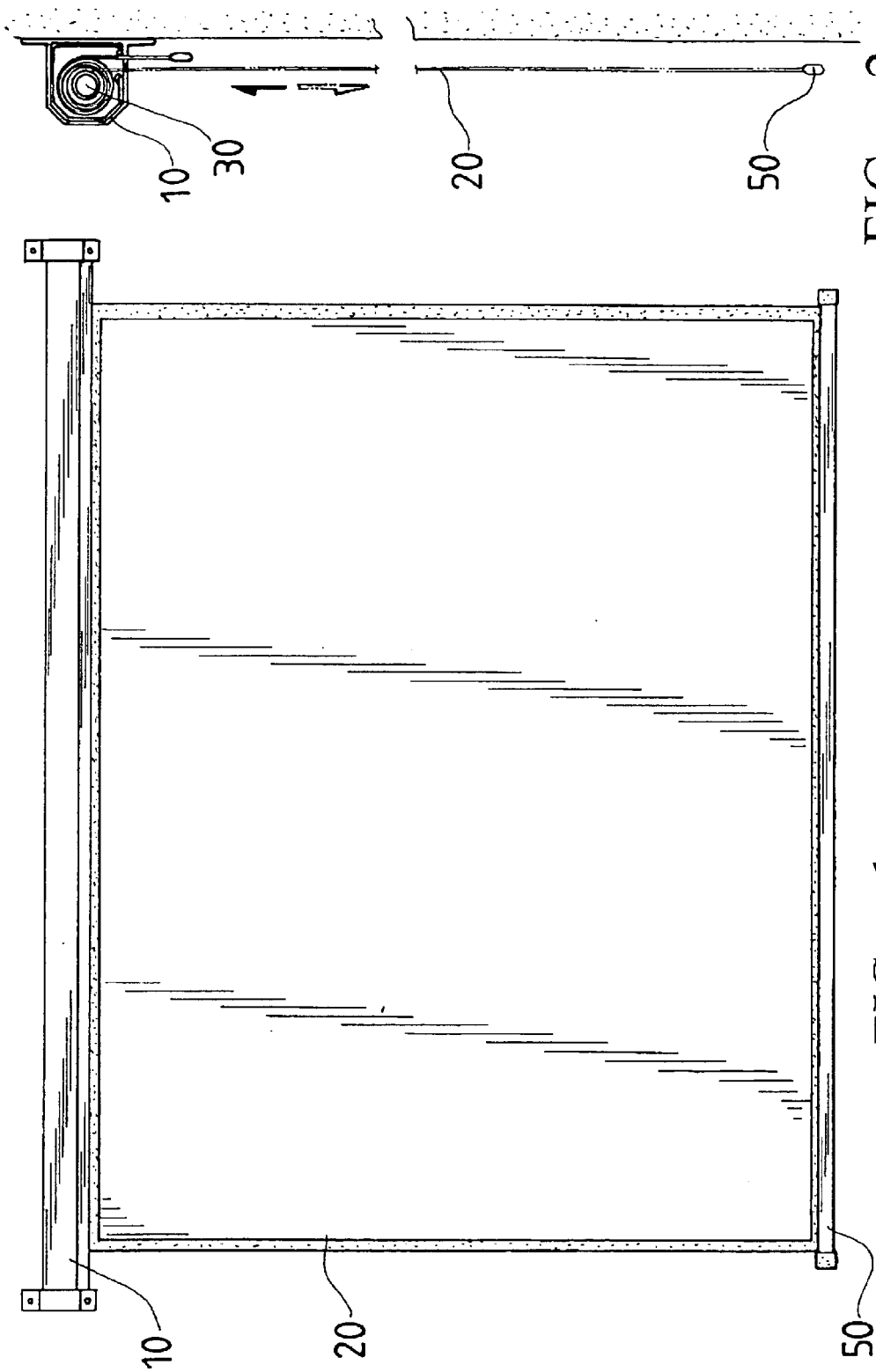
FIG. 1 is a front view of a conventional electric projection screen roller placed in a protective housing and a projection screen unwinding from the roller to a viewing arrangement.
FIG. 2 is a cross-sectional schematic view of the conventional electric projection screen roller placed in a protective housing and a projection screen unwinding from the roller to descend below the housing to a viewing arrangement or winding around the roller to a raised position.
Figure 3:
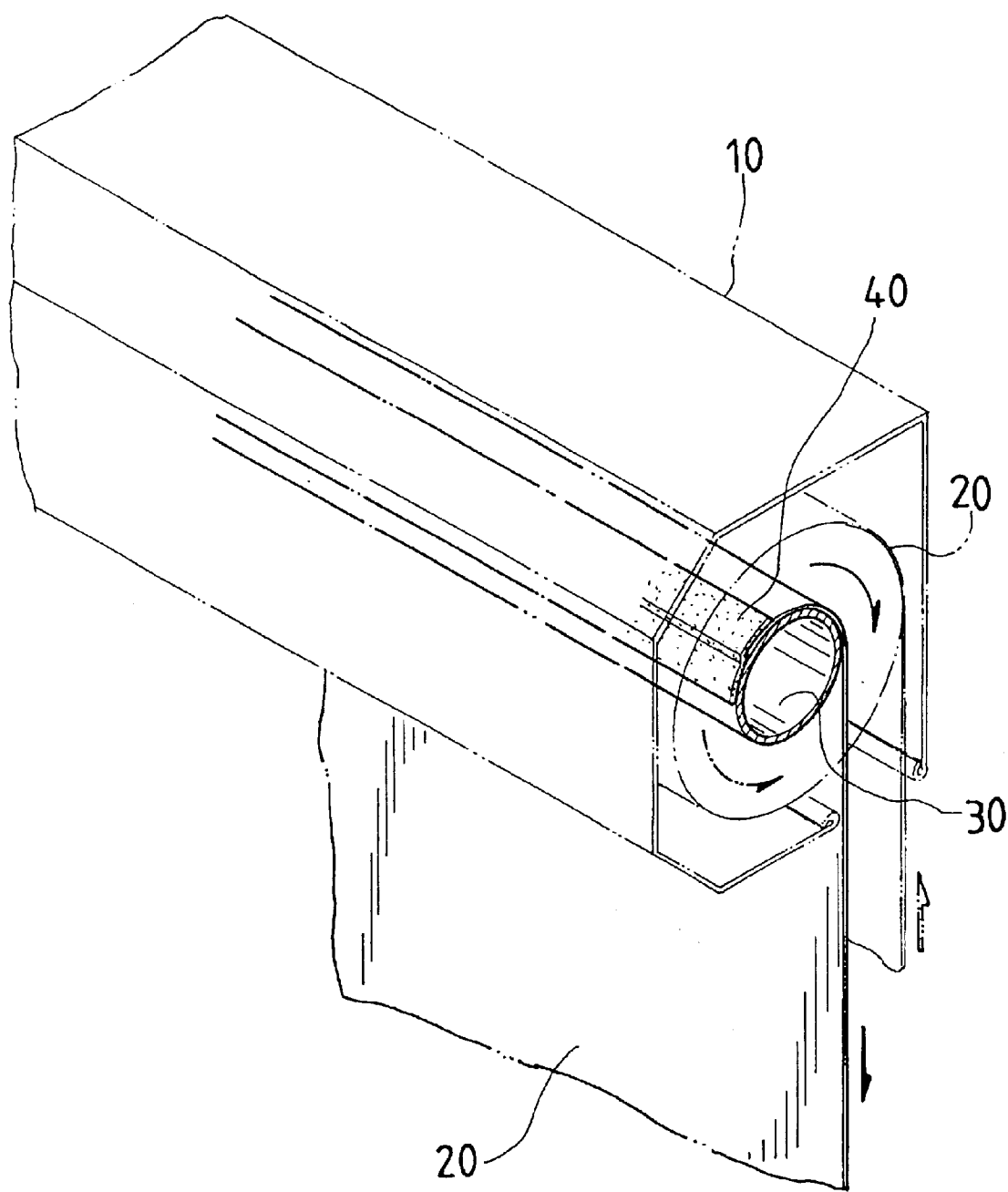
FIG. 3 is a perspective schematic view of the conventional electric projection screen roller placed in a protective housing and a projection screen unwinding from the roller to descend below the housing arrangement.
Figure 4:
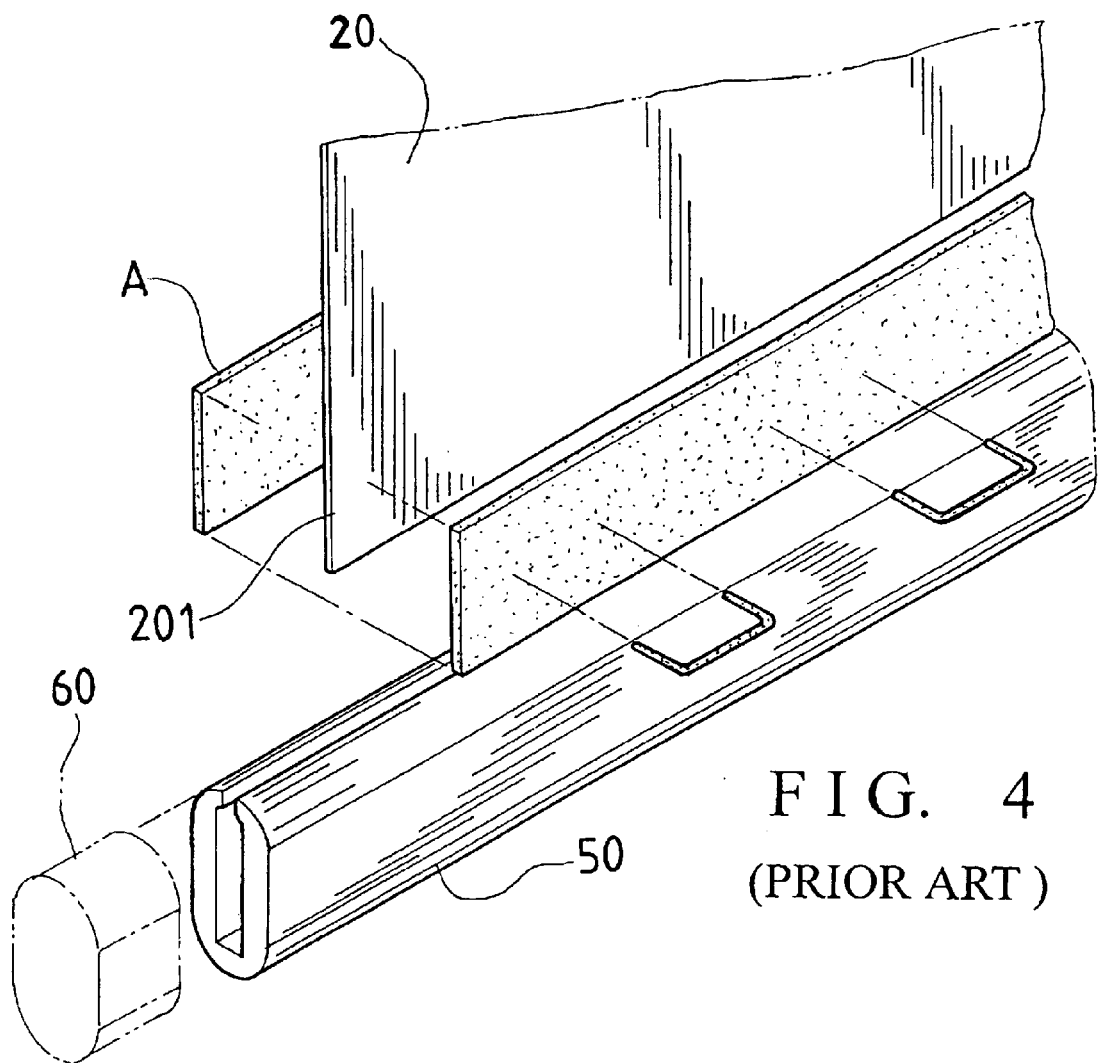
FIG. 4 is a perspective exploded view of a conventional projection screen balance rod.
Figure 5:
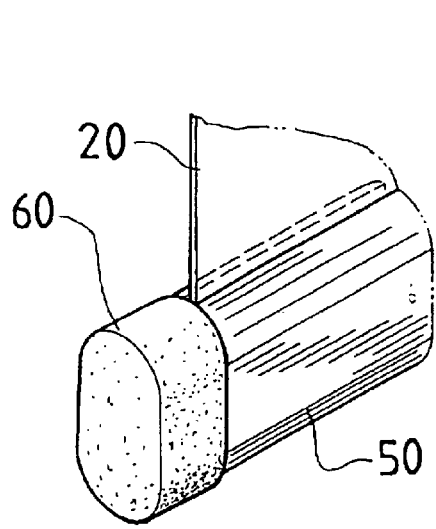
FIG. 5 is a perspective view of a conventional projection screen balance rod in assembled configuration.
Figure 6:
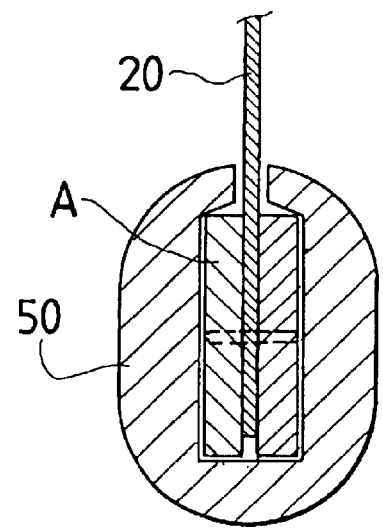
FIG. 6 is a cross-sectional view of a conventional projection screen balance rod in assembled configuration.
Figure 7:
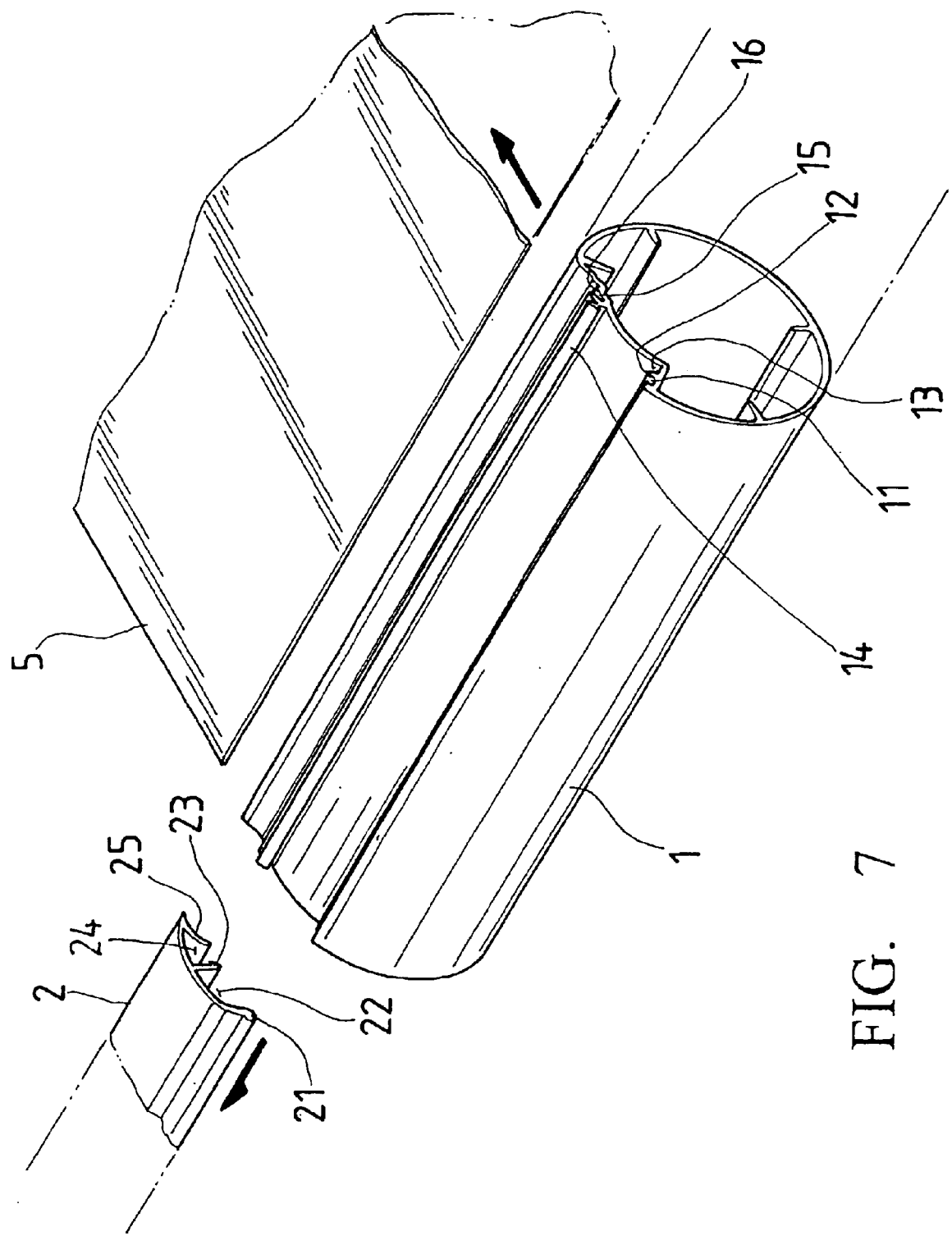
FIG. 7 is a perspective exploded view of an embodiment of the electric projection screen roller assembly in accordance with the present invention.

Referring to FIG. 7, the projection screen roller assembly is composed by a main body 1 and an inserting piece 2. The main body 1 is provided with a groove 11 in one predetermined position of the upper facing surface, a flanged strip 12 is provided adjacent to the groove 11, a hollow 13 is provided adjacent to the flanged strip 12, a slant against block 14 is provided at one predetermined position on the upper facing surface of the main body 1, a recess 15 is provided at one side of the slant against block 14, and the characteristic lies in that an inlaying socket 16 is provided adjacent to the recess 15.

The inserting piece 2 is provided with a flange 21 at one side, a hollow 22 is formed adjacent to the flange 21, a hook block 23 is provided adjacent to the hollow 22, another hollow 24 is formed adjacent to the hook block 23, and the characteristic lies in that a curved against member 25 is provided at the other side of the inserting piece 2 and adjacent to the another hollow 24.

Figure 10:
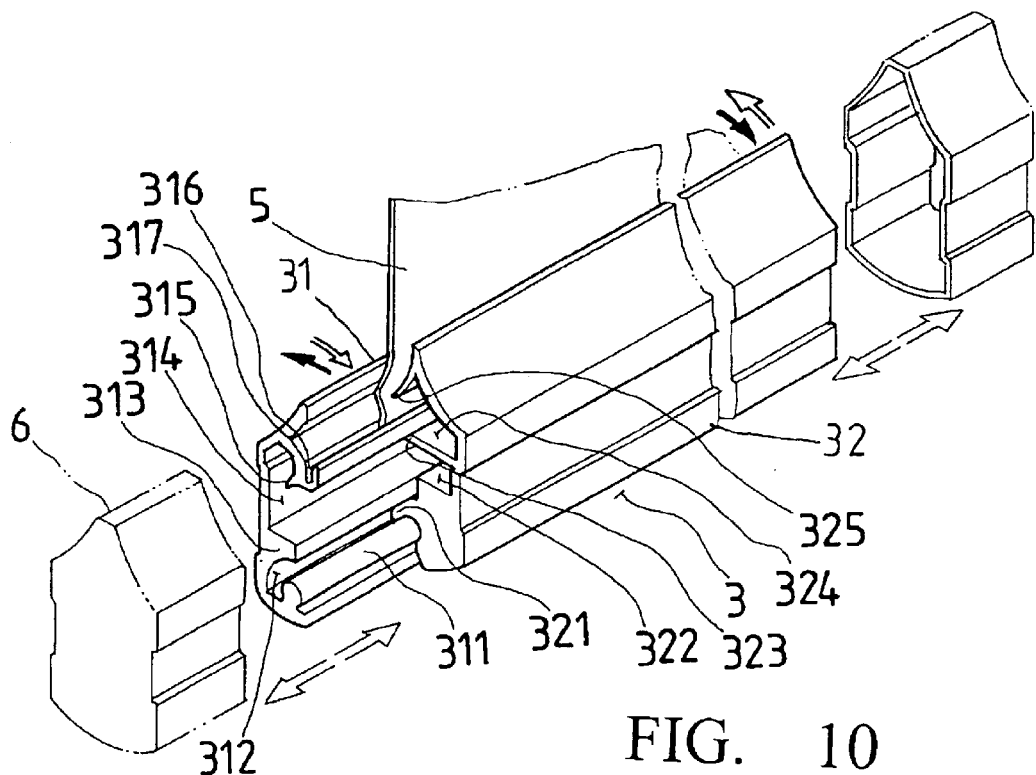
FIG. 10 is a perspective exploded view of an embodiment of the electric projection screen balance rod assembly in accordance with the present invention.

Referring to FIG. 10, the projection screen balance rod assembly 3 is composed by a left half portion 31 and a right half portion 32. The left half portion 31 is provided with a pivotal flange 311 at the bottom, a sliding groove 312 is formed in the inner side of the pivotal flange 311, a protruding block 313 is provided above the sliding groove 312, a hollow 314 is formed above the protruding block 313, a slant against block 315 is provided above the a hollow 314, a recess 316 is provided above the slant against block 315, and the characteristic lies in that an inlaying socket 317 is provided above the recess 316.

The right half portion 32 is provided with a pivotal curved member 321 at the bottom, a hollow 322 is provided above the pivotal curved member 321, a hook member 323 is provided above the hollow 322, another hollow 324 is formed above the hook member 323, and the characteristic lies in that a curved against member 325 is provided above the another hollow 324.

Figure 8:
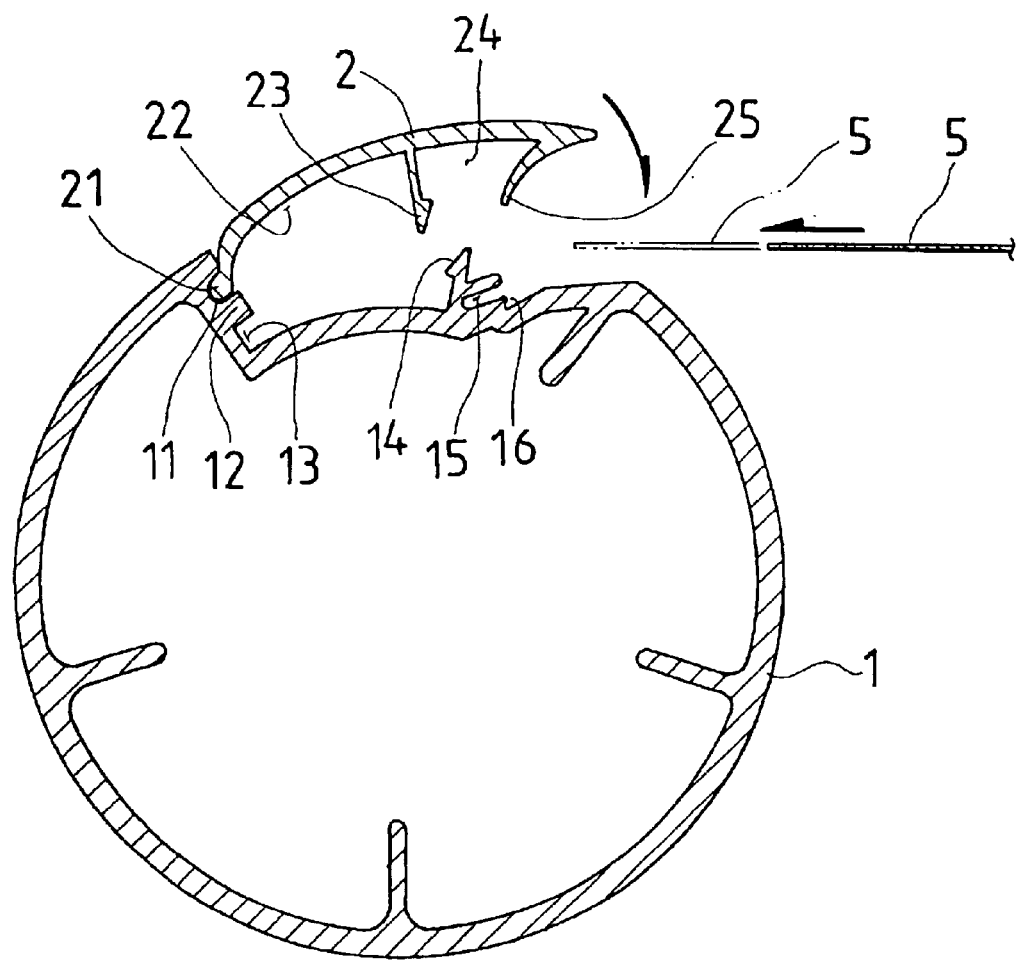
FIG. 8 is a cross-sectional schematic view of an embodiment of the electric projection screen roller assembly while being assembled in accordance with the present invention.
Figure 9:
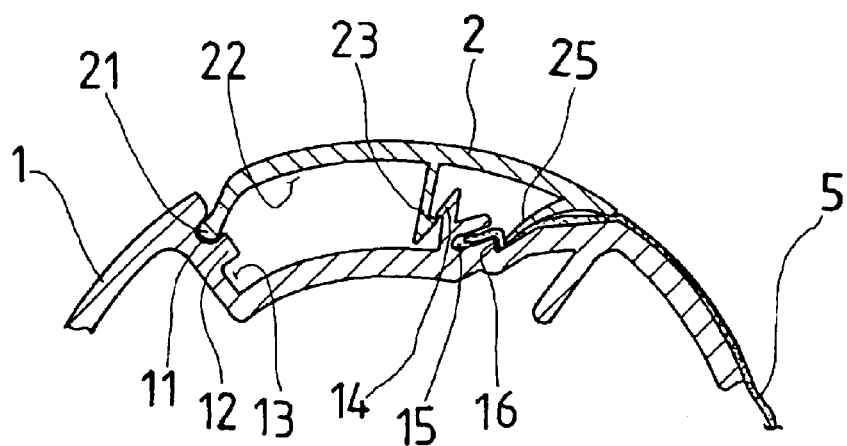
FIG. 9 is a cross-sectional schematic view of an embodiment of the electric projection screen roller assembly in assembled configuration in accordance with the present invention.

Referring to FIGS. 8 and 9, while the projection screen roller assembly being assembled, the flange 21 of the inserting piece 2 is inserted in the groove 11 of the main body 1, the upper end section of a projection screen 5 is inserted into the recess 15, then the inserting piece 2 is pressed to firmly assemble with the main body 1, so as to force the hook block 23 of the inserting piece 2 to be caught by the slant against block 14 of the main body 1, and the curved against member 25 of the inserting piece 2 is caught in the inlaying socket 16, so as for the upper end section of the projection screen 5 to be firmly secured between the main body 1 and the inserting piece 2. When the inserting piece 2 is pulled away from the main body 1 to a certain distance and moved to separate from the main body 1, the upper end section of the projection screen 5 can be easily released.

Figures 11, 12:
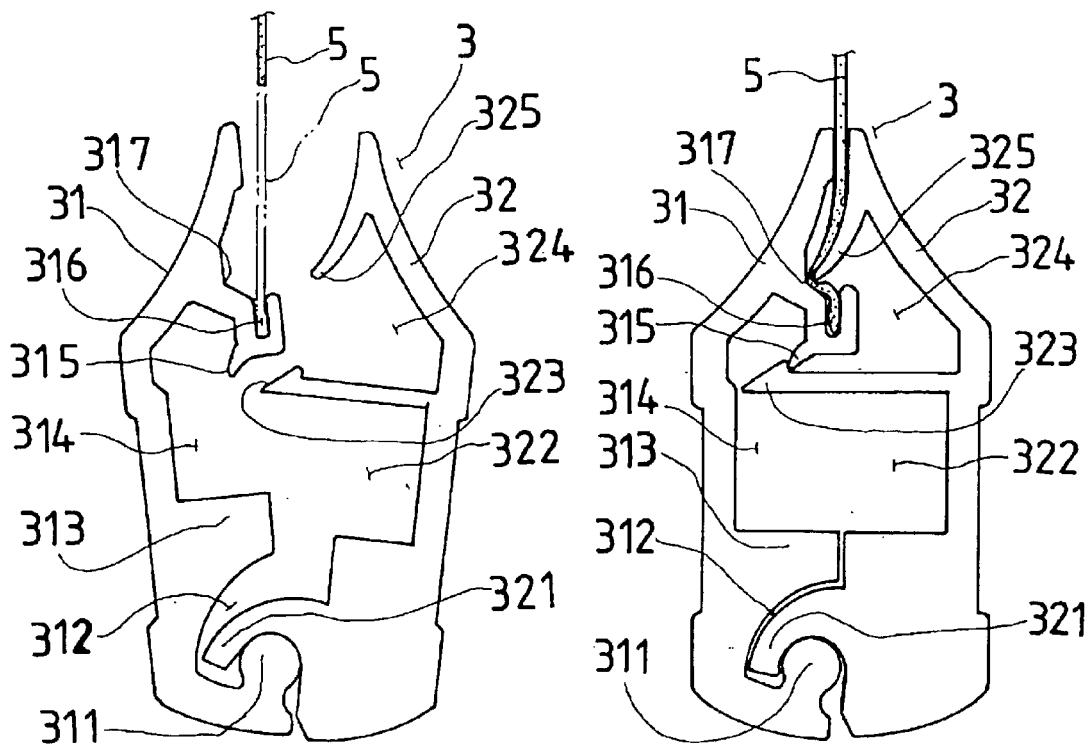
FIG. 11 is a cross-sectional schematic view of an embodiment of the electric projection screen balance rod assembly while being assembled in accordance with the present invention.
FIG. 12 is a cross-sectional view of an embodiment of the electric projection screen balance rod assembly in assembled configuration in accordance with the present invention; and, FIG. 13 is a cross-sectional schematic view of an embodiment of the electric projection screen roller assembly placed in a protective housing and a projection screen with the balance rod assembly unwinding from the roller assembly or winding around the roller assembly.

Referring to FIGS. 11 and 12, while the projection screen balance rod assembly being assembled, the pivotal curved member 321 of the right half portion 32 is inserted in the sliding groove 312 of the left half portion 31, the lower end section of a projection screen 5 is inserted into the recess 316 of the left half portion 31, then the left half portion 31 and the right half portion 32 are pressed to firmly assemble together, so as to force the hook member 323 of the right half portion 32 to be caught by the slant against block 315 of the left half portion 31, the curved against member 325 of the right half portion 32 is caught in the inlaying socket 317, so as for the lower end section of the projection screen 5 to be firmly secured between the left half portion 31 and the right half portion 32, and two endcaps 6 are respectively provided to cover both ends of the balance rod assembly 3. When the left half portion 31 is pulled away from the right half portion 32 to a certain distance and moved to separate from the right half portion 32, the lower end section of the projection screen 5 can be easily released, referring to FIG. 10.

Figure 13:
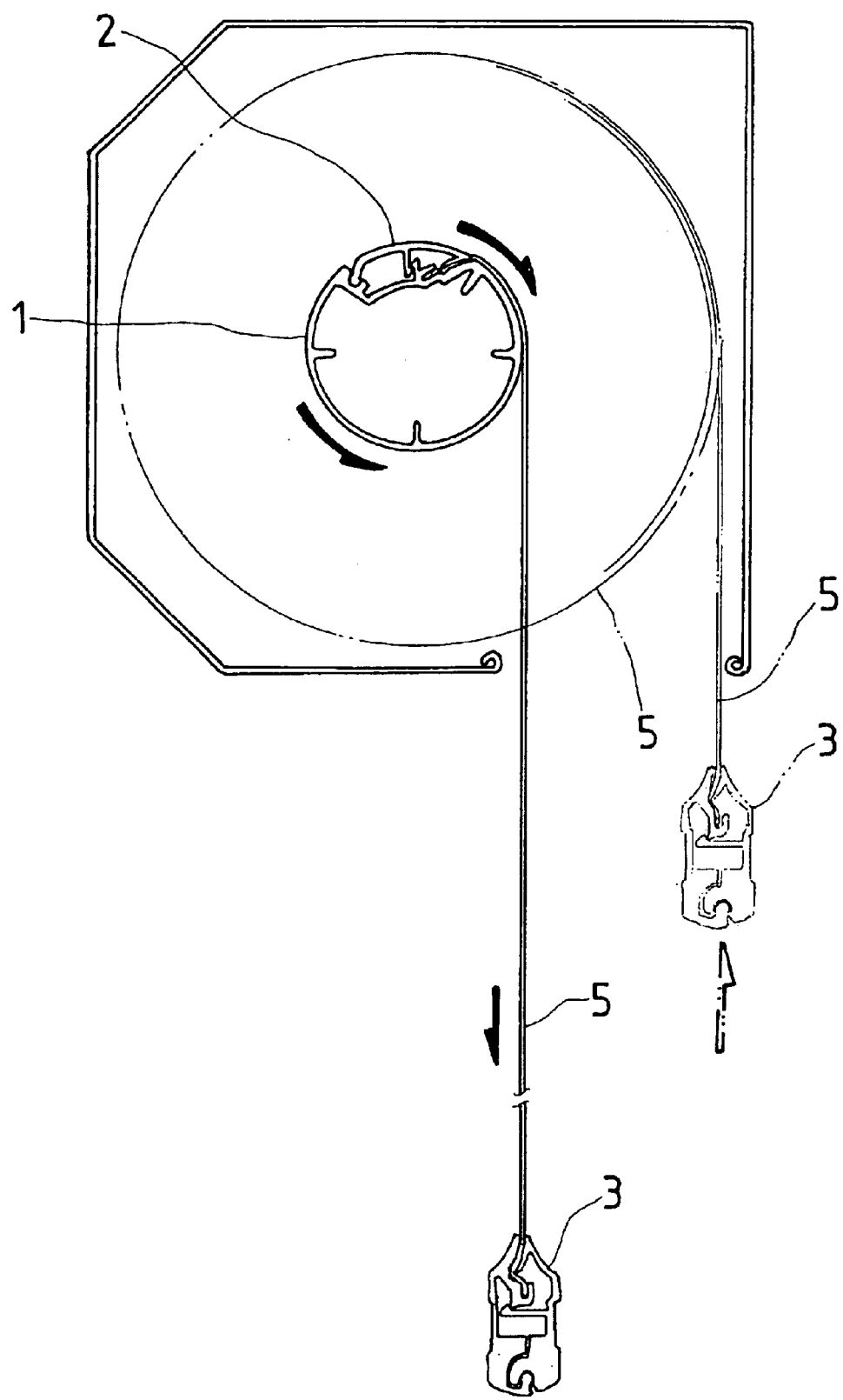

As shown in FIG. 13, the above-mentioned present invention of the projection screen roller and balance rod assembly is not only easily assembled or disassembled but also can respectively firmly secure each end section of the projection screen 5, so as to prolong the service life.

While the preferred embodiments of the invention have been described above, it will be recognized and understood that various modifications may be made thereto and the appended claims are intended to cover all such modifications which may fall within the spirit and scope of the invention.

What is claimed is:

1. An electric projection screen roller assembly comprising:

a main body being provided with a groove in one predetermined position of the upper facing surface, a flanged strip being provided adjacent to said groove, a hollow being provided adjacent to said flanged strip, a slant against block being provided at one predetermined position on the upper facing surface of said main body, a recess being provided at one side of said slant against block, and an inlaying socket being provided adjacent to said recess; and, an inserting piece being provided with a flange at one side, a hollow being formed adjacent to said flange, a hook block being provided adjacent to said hollow, another hollow being formed adjacent to said hook block, and a curved against member being provided at the other side of said inserting piece and adjacent to said another hollow.

2. An electric projection screen balance rod assembly comprising:

a left half portion being provided with a pivotal flange at the bottom, a sliding groove being formed in the inner side of said pivotal flange, a protruding block being provided above said sliding groove, a hollow being formed above said protruding block, a slant against block beind provided above said another hollow, a recess beind provided above said slant against block, and an inlaying socket being provided above said recess; and, a right half portion being provided with a pivotal curved member at the bottom, a hollow being provided above said pivotal curved member, a hook member being provided above said hollow, another hollow being formed above said hook member, and a curved against member being provided above said another hollow.

* * * * *